United States Patent
Sorensen et al.

(12)

(10) Patent No.: US 6,810,116 B1
(45) Date of Patent: Oct. 26, 2004

(54) MULTI-CHANNEL TELEPHONE DATA COLLECTION, COLLABORATION AND CONFERENCING SYSTEM AND METHOD OF USING THE SAME

(75) Inventors: Jeffrey Scott Sorensen, Seymour, CT (US); Satyanarayana Dharanipragada, Ossining, NY (US); Borivoj Tydlitat, Praha (CZ)

(73) Assignee: International Business Machines Corporation, Armonk, NY (US)

( * ) Notice: Subject to any disclaimer, the term of this patent is extended or adjusted under 35 U.S.C. 154(b) by 665 days.

(21) Appl. No.: 09/659,943

(22) Filed: Sep. 12, 2000

(51) Int. Cl.$^7$ ................................................ H04M 1/64
(52) U.S. Cl. ................................ 379/202.01; 379/88.13
(58) Field of Search .......................... 379/88.01, 88.02, 379/88.03, 88.04, 88.05, 88.06, 88.13, 88.15, 88.2, 88.21, 88.22, 207.01, 90.01, 206.01, 202.01, 203.01, 205.01; 704/270

(56) References Cited

U.S. PATENT DOCUMENTS

| | | | |
|---|---|---|---|
| 3,674,936 A | 7/1972 | Wolfe | 179/1.5 R |
| 3,958,084 A | 5/1976 | Nicholas | 179/1 |
| 4,908,866 A | 3/1990 | Goldwasser et al. | 381/44 |
| 5,483,588 A * | 1/1996 | Eaton et al. | 379/202 |
| 5,771,273 A | 6/1998 | McAllister et al. | 379/67 |
| 5,916,302 A | 6/1999 | Dunn et al. | 709/204 |
| 6,327,343 B1 * | 12/2001 | Epstein et al. | 379/88.01 |
| 2003/0053444 A1 * | 3/2003 | Swartz | 370/352 |
| 2003/0125954 A1 * | 7/2003 | Bradley et al. | 704/270 |

* cited by examiner

Primary Examiner—William J. Deane, Jr.
(74) Attorney, Agent, or Firm—Louis J. Percello; Dilworth & Barrese, LLP

(57) ABSTRACT

A multi-channel telephone data collection, collaboration and conferencing system for use with a plurality of telephone channels, the telephone channels being interconnected to facilitate a conference call between a plurality of telephone conferencing devices, the system comprising: a call processor having at least two telephone conferencing device input/output ports connected to the processor and to the plurality of telephone conferencing devices, the call processor generates an audio signal corresponding to each of the plurality of telephone conferencing devices connected to the telephone input/output ports; an audio saving module, connected to the call processor, that converts the audio signal corresponding to each of the plurality of telephone conferencing devices to a digital signal; a memory device that stores the digital signals corresponding to each conference device; an audio switch, connected to the call processor and the memory device, that has a plurality of audio inputs corresponding to each of the conference devices and that selects an appropriate audio input to present to the output ports of the call processor in response to a select signal; and an application logic controller, connected to the call processor, the audio switch and to the memory device, that controls the operation of the system and generates the select signal according to a programmable talk mode.

28 Claims, 3 Drawing Sheets

MULTI-CHANNEL TELEPHONE DATA COLLECTION, COLLABORATION AND CONFERENCING SYSTEM AND METHOD OF USING THE SAME

BACKGROUND OF THE INVENTION

1. Field of the Invention

This invention relates generally to telephonic voice communication and switching, and in particular to a multi-channel telephone data collection, collaboration and conferencing system and method.

2. Description of the Related Art

Numerous techniques, ranging from the simple to the complex, exist to perform telephone conference calls. A simple three party analog conference call is frequently implemented by adding the third party across an existing two party circuit, while complex conference calls are implemented using a digital voice transmission and switching system.

Common conference calls can be either analog or digital in nature and the techniques to perform the conference call follow either an additive approach or switched approach. In the additive approach, each conference participant receives the algebraic sum of the signals of the other conference participants. In the switched approach, an attempt is made to discover which conference participants are the speakers, and those speaker's signals are then sent to the other conference participants. Typically, analog conference techniques follow the additive approach, while digital conference techniques may follow either the additive or the switched approach.

In the digital environment, additive techniques suffer from several difficulties. First, the range of amplitude levels of the signals must conform to set minimum and maximum values in order to be transmitted. While each conference participant's signal may stay within the acceptable bounds, the sum of all of the conference participants may not. Another difficulty with the additive method is the presence of not only the speaker's signals but also the combined idle channel noise of all of the silent conference participants.

For these reasons, the switched approach has most often been proposed for digital conferencing circuits, but the known prior art has several deficiencies.

U.S. Pat. No. 3,674,936 to Wolfe discloses a voice conferencing system. The system gives a modular data processing system the facility for providing virtual cut through ("VCT") service that allows the transmission of continuous traffic as well as digital voice communications. The term virtual cut through refers to the ability of the system to receive the message and pass it through the system for transmission practically simultaneously. That is, it is accomplished as if the incoming circuit were actually switched to the outgoing circuit as is done in a circuit switching system. The system accomplishes the virtual cut through without circuit switching by providing a path through the system between input and output lines virtually directly. It is done without any inspection of the incoming data whatsoever. The data may or may not be encrypted to provide a means for secure communication. In order to prevent superposition of the incoming voices, a priority scheme is used wherein each participant automatically excludes those "below" him while he is talking. The assignment of the priority of each conference participant is made by the originator of the conference call when setting up the call (See Wolfe, column 3, lines 10–15). The Wolfe reference does not disclose the ability to schedule the playback of the telephone conference call participants according to a programmable talk mode nor the ability to use speech recognition as a controlling means.

U.S. Pat. No. 3,958,084 to Nicholas discloses a conferencing apparatus. The apparatus selects a conference participant if the speaker's signal has exceeded a predetermined reference level. The reference level is continuously allowed to decay so that new speakers may gain the floor when the current speaker's peak signal falls below the peak signal of another speaker. In addition, the Nicholas reference directs the incoming signals of the conference participants to all of the other conference participants. The Nicholas reference does not disclose the ability to schedule the playback of the incoming signals nor does it disclose the use of speech recognition to control the operation of the system.

U.S. Pat. No. 5,916,302 to Dunn et al. discloses a multimedia conferencing system using parallel networks and is owned by the assignee of the present invention. The Dunn reference discloses a conference server system for internal use in the public switched telephone network (PSTN) for distributing computer displayable data between participants in voice telephone conferences. A speech recognition apparatus within the PSTN may be linked to a conference bridge for recognizing voice commands of conference participants and enabling either management of the system or the data network to perform actions associated with such commands (See Dunn, column 9, lines 22–29). The Dunn reference does not disclose control over the sequencing of audio playback, the use of text to speech synthesis by the controller, or the ability to transcribe the separate channels of the conference call.

U.S. Pat. No. 5,771,273 to McAllister et al. discloses a network accessed personal secretary. The McAllister reference is accessible by a subscriber whenever the subscriber's telephone is in an off-hook state. Speech recognition means are placed to monitor the subscriber line and be responsive to a pre-selected utterance that generates a signal to access the platform. The signal generated by the speech recognition means is received at a central office switch and is associated with the subscriber line. The generated signal acts as a "wake-up" signal for bridging the subscriber line with the service platform. When the subscriber is connected to the platform, the platform is activated to perform functions for the subscriber such as relaying voice and fax messages, maintaining a calendar and event scheduler that is reviewed on request, setting up conference calls, and dialing calls to specific destinations (See McAllister, column 3, lines 50–54). The McAllister reference does not disclose the ability to schedule or sequence the incoming signals of the conference participants nor the ability to share information about the status and nature of other callers in the system using parallel speech recognition.

U.S. Pat. No. 4,908,866 to Goldwasser et al. discloses a speech transcribing system. The device enables transcription of spoken speech wherein periods of silence are deleted without interfering with the reproduction function. The reference records the spoken word and stores the spoken words in a memory. A typist can then listen to the recorded spoken word and transcribe the speech as if he or she was hearing them directly from the speaker's mouth. Since most typists cannot normally keep up with dictation, the typist may change the time delay through the memory buffer from zero to some number of seconds. The Goldwasser reference does not disclose the ability to directly transcribe spoken speech to text using a speech recognition system nor the ability to control the behavior of the transcription capabilities via either voice command or DTMF commands.

Therefore, there remains a need for a telephone conferencing system which permits the user to define several programmable talk modes with which to schedule playback of the input signals received from each conference participant. In addition there remains a need for the automatic speech to text transcription capability for each incoming channel, and the use of speech recognition to set up and control the operations of the conference call.

SUMMARY OF THE INVENTION

It is therefore an object of the present invention to provide a multi-channel telephone data collection, collaboration and conferencing system and method that permits the conference participants to schedule the playback of incoming signals according to a programmable talk mode.

It is an additional object of the present invention to provide a multi-channel telephone data collection, collaboration and conferencing system and method that provides automatic channel by channel transcriptions during a conference call.

It is also an object of the present invention to provide a multi-channel telephone data collection, collaboration and conferencing system and method that uses text to speech synthesis to announce pertinent data and the addition or deletion of conference participants to all conference participants during the conference call.

It is yet another object of the present invention to provide a multi-channel telephone data collection, collaboration and conferencing system and method that can be used to train a speech recognition application to recognize spoken words over several different channels.

To achieve these and other objects and features of the present invention, there is provided a multi-channel telephone data collection, collaboration and conferencing system. The multi-channel telephone data collection, collaboration and conferencing system for use with a plurality of telephone channels interconnected to facilitate a conference call between a plurality of conferencing devices comprises a call processor having at least two conferencing device input/output ports connected to the processor and to the plurality of conferencing devices. The call processor generates an audio signal corresponding to each of the plurality of conferencing devices connected to the input/output ports. An audio saving module, connected to the call processor, converts the audio signal corresponding to each of the plurality of conferencing devices to a digital signal. A memory device stores the digital signals corresponding to each conference device and an audio switch, connected to the call processor and the memory device has a plurality of audio inputs corresponding to each of the conference devices. An application logic controller is connected to the call processor, the audio switch and to the memory device and controls the operation of the system and generates a select signal according to a programmable talk mode, the select signal selects at least one of the audio switch inputs to present to the output ports of the call processor.

The system operates to allow any of the following actions to be implemented during a conference call: add predetermined conferencing devices to the conference call; add new conferencing devices to the conference call on an ad hoc basis; selectively remove (disconnect) conferencing devices from the conference call; permit the conference call to be sub-divided into a plurality of sub-conference calls between subgroups of the plurality of conferencing devices; and block portions of the conference call relative to a subset of its current conferencing devices.

The teleconferencing method for use with a plurality of telephone channels interconnected to facilitate a conference call between a plurality of conferencing devices comprises the steps of receiving an audio input signal corresponding to each of the plurality of conferencing devices; storing the audio input signal in a memory device; retrieving at least one audio input signal stored in the memory device in accordance with a programmable talk mode; and outputting the at least one audio input signal to the plurality of conferencing devices.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
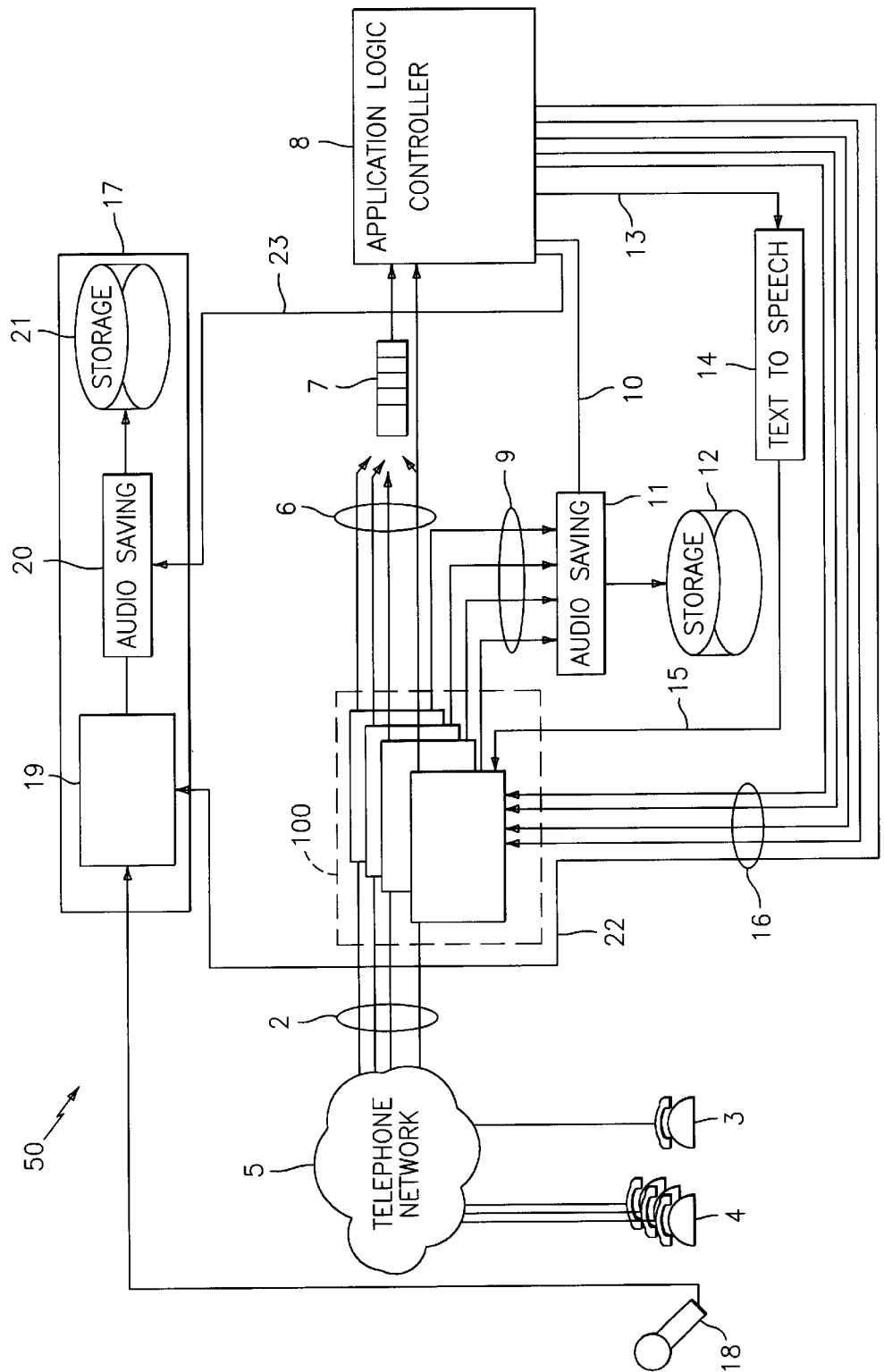
FIG. 1 is a schematic diagram of an embodiment of the multi-channel telephone data collection, collaboration and conferencing system.

Referring now to the drawings, in which similar reference characters denote similar or identical elements throughout the several views, FIG. 1 refers to a schematic diagram of an embodiment of a multi-channel telephone data collection, collaboration and conferencing system 50. System 50 is comprised of a master phone 3 and a plurality of slave phones 4 each connected to a telephone network 5. Phones 3, 4 may be other conference devices including, but not limited to, personal computers, mobile phones and/or hand held personal assistants. A call processor 100 is connected to telephone network 5 via a plurality of telephone channels 2 each corresponding to a telephone 3, 4. Call processor 100 separates each incoming call signal from telephone channel 2 into a logical event signal 6 and/or an audio signal 9. Logical event signal 6 may be a DTMF signal used to control the operation of system 50, and is optionally stored in a control logic queue 7. An application logic controller 8 controls the overall operation of the system and receives logical event signals 6 either directly from call processor 100 or from control logic queue 7. Application logic controller 8 may be comprised of an electrically erasable and programmable read only memory (EEPROM) or other programmable memory device.

Application logic controller 8 generates several control signals to control the operation of system 50. A remote record signal 23 triggers the recording of incoming call signals via an independent recording system 17, while a select signal 10 triggers the recording of incoming audio signal 9 via an audio saving module 11. A plurality of channel control signals 16 are generated via application logic controller 8 and control the operations of each telephone channel 2 via call processor 100. Included in the plurality of channel control signals 16 is an independent control signal 22 that controls the operation of a remote call processor 19 located in independent recording system 17.

Independent recording system 17 is comprised of remote call processor 19, a remote audio saving module 20 and a remote storage device 21. Independent recording system 17 uses a microphone 18 to input an audio signal for subsequent recording of an additional input signal. Audio saving module 20 is triggered by remote record signal 23.

A text to speech processor 14 converts a text signal 13 into a speech signal 15 and presents speech signal 15 to call processor 100 for playback to the plurality of phones 3,4. Text to speech processor 14 enables text messages to be transmitted to the plurality of telephones 3,4 via call processor 100. The text messages may be previously stored menu choices, system status messages or other external text messages.

Figure 2A:
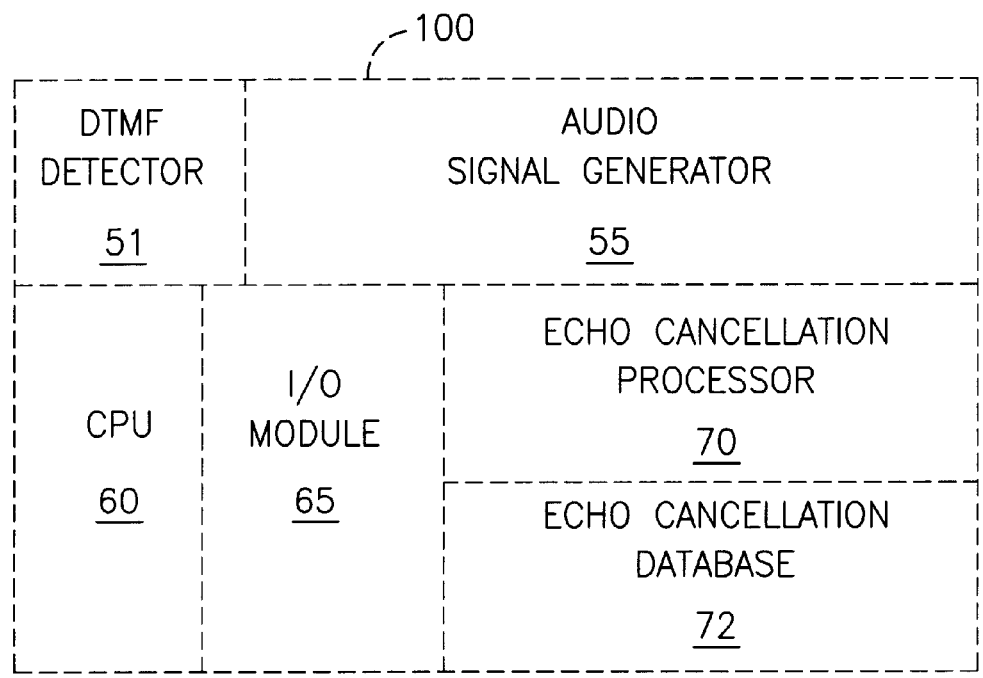
FIG. 2a is a block diagram of a call processor according to FIG. 1.

FIG. 2a shows a block diagram of call processor 100 according to FIG. 1. Call processor 100 is further comprised of a DTMF detector 51 that detects DTMF tones for each of the incoming telephone channels 2 and generates logical event signal 6 if a DTMF signal is detected. In addition, an audio signal generator 55 passes the incoming signal to audio saving module 11 for recording. A central processing unit (CPU) 60 receives channel control signals 16 from application logic controller 8 and coordinates the operation of call processor 100. An input/output module (I/O) 65 receives the incoming call from each channel 2 and transmits an outgoing call, if present, to the plurality of telephones 3,4. In addition, an echo cancellation processor 70 receives signals on each channel 2 and provides a corresponding output signal that virtually eliminates noise and interference from the channel. The output of echo cancellation module 70 may be used when detecting DTMF signals or applied to a speech recognition processor. Echo cancellation processor 70 uses information contained in an echo canceling database 72 to generate a clean audio input signal that is virtually free from interference signals.

Figure 2B:
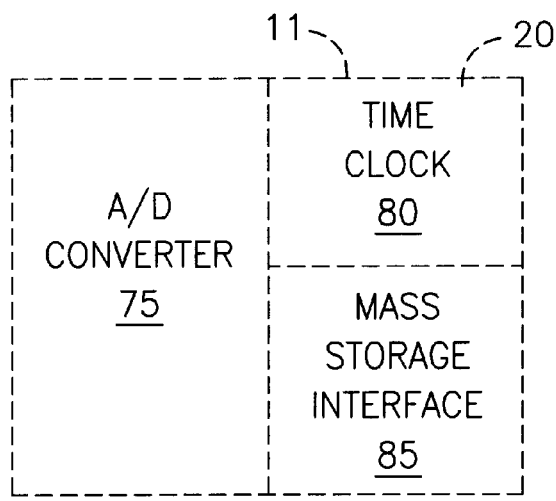
FIG. 2b is a block diagram of an audio saving module according to FIG. 1.

FIG. 2b is a block diagram of audio saving modules 11, 20 according to FIG. 1. Audio saving modules 11, 20 are comprised of an analog to digital converter (A/D) 75 for converting the incoming channel 2 signal data into digital form and a synchronized time clock 80 for recording the start time and stop time of the incoming channel 2 signal. In addition, modules 11, 20 contain a mass storage interface 85 for accessing at least one of remote storage device 21 or a storage device 12.

Multi-channel telephone data collection, collaboration and conferencing system 50 operates to record a single telephone call or part thereof across many simultaneous telephone channels 2, each channel having a potentially different acoustic signal quality. Application logic controller 8 generates a corresponding channel control signal 16 depending upon how many channel samples are desired. Master phone 3 enters DTMF key inputs to control the recording start and stop on all channels and the number of desired recording samples. Once a DTMF code is received, DTMF detector 51 detects the code and generates logic event signal 6. Logic event signal 6 may be either stored in queue 7 or passed directly to application logic controller 8. In addition, select signal 10 is triggered to begin or end the recording of the audio signal 9 based upon the received DTMF key entered by master phone 3. Audio signal 9 is first converted to a digital signal via A/D converter 75 of audio saving module 11 and then stored along with start and stop time data in storage device 12. The independent recording system 17 system operates in the same manner.

This recorded digital representation of spoken words over several telephone channels is valuable for companies that perform data collection and are interested in characterizing the variation across multiple audio streams. Such companies may utilize the recorded data to train a speech recognition application. Given the potential variations of each telephone channel 2, the recorded data provides a robust training set for speech recognition applications. Audio saving modules 20 and 11 accurately note the exact time that each signal is received and the times are recorded in storage devices 21 and 12 respectively. The timing data provides time alignment for each recorded signal and is useful in training the speech recognition application with multiple samples of the same spoken word.

Figure 3:
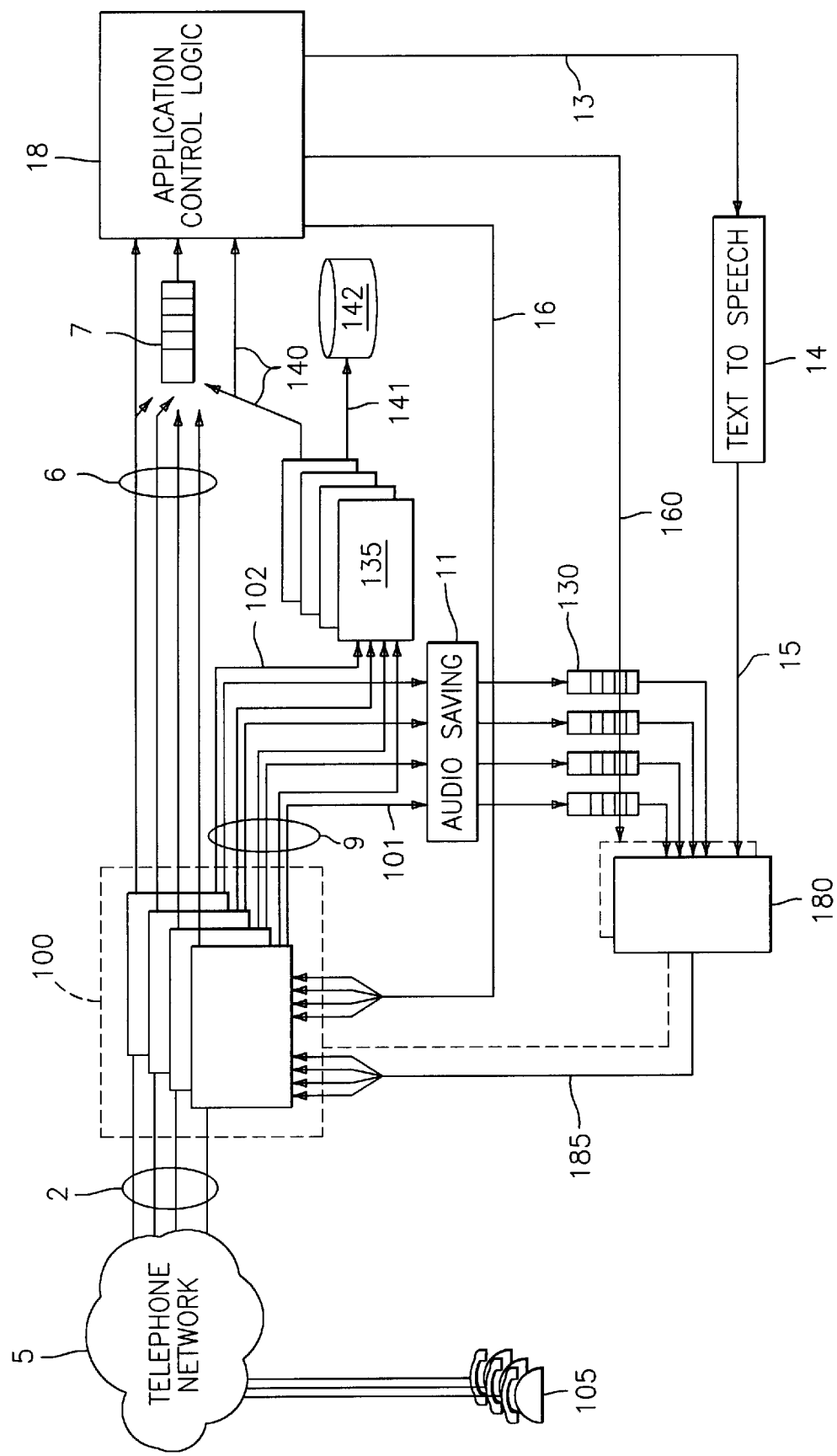
FIG. 3 is a schematic diagram of a preferred embodiment of the multi-channel telephone data collection, collaboration and conferencing system.

FIG. 3 is a schematic diagram of a preferred embodiment of a multichannel telephone data collection, collaboration and conferencing system. The system 50 is comprised of a plurality of conference participants 105 connected to telephone network 5. A call processor 100 is connected to telephone network 5 via a plurality of telephone channels 2 each corresponding to a conference participant 105. Call processor 100 separates each incoming call from telephone channel 2 into a logical event signal 6 and/or an audio signal 9. Logical event signal 6 may be a DTMF signal and is used to control the operation of system 50. Logical event signal 6 may also be other signaling events such as ringing, answering (off-hook), hangup (on-hook), or disconnect, and is optionally stored in a control logic queue 7. An application logic controller 8 controls the overall operation of the system and receives logical event signals 6 either directly from call processor 100 or from control logic queue 7. Application logic controller 8 generates control signals to control the operation of system 50, including a plurality of channel control signals 16 to control the operations of each telephone channel 2. Channel control signals 16 can mute individual channels 2 in order to provide a clear conference call.

In the preferred embodiment, audio signal 9 is further comprised of a raw audio component 101 and an echo cancellation component 102. Raw audio component 101 is fed into audio saving module 11 for conversion to a digital signal and stored through mass storage interface 85 in a plurality of temporary audio queues 130. The outputs of audio queues 130 are presented to an audio switch 180 that is controlled by application logic controller 8 via a switch select signal 160. Audio switch 180 selects from among the plurality of signals input from audio queues 130 and outputs an appropriate signal or signals 185 to control processor 100.

Application logic controller 8 generates switch select signal 160 in response to a programmable talk mode. The programmable talk modes may be, for example, a "chat" mode, a "conference" mode, a "short-over-long" mode, a "push-to-send" mode or a "priority" mode. In addition, the system is configurable to create new talk modes based upon the needs of the conference participants. New programmable talk modes can be created by modifying application logic controller 8 so that different switch select signals are generated to select the desired playback sequence.

The system 50 according to the present invention is controllable via logical event signal 6 and/or control event 140. Event signal 6 and control event 140 are used to switch between programmable chat modes, to initiate and terminate recording events, to add, suspend or delete conference participants or to break the conference call into a sub-set of smaller conference calls. For example, the pound (#) key can be used to send a participant's message while the star key (*) can cancel the message. This arrangement allows even greater editorial control over the conference call.

In the preferred embodiment, the "chat" mode refers to the recording and playback of messages in the order of arrival. Only one message is played at a time and the other messages are stored in temporary audio queue 130. In this manner, only one participant is heard and the other speakers are muted. This is accomplished by generating a switch select signal 160 that only selects the appropriate input signal of audio switch 180 to output 185 to call processor 100. A "conference" mode refers to the common conference call configuration where all participants' signals are output to all of the other conference participants simultaneously. A "short-over-long" mode generates a switch select signal 160 that selects the shortest input signal presented to audio switch 180 for output 185 to call processor 100. The shortest message is determined by subtracting a stop time from a start time for the message and storing the message duration in temporary audio queue 130. The "push to send" mode acts similar to the chat mode in that each message is stored in a queue for subsequent playback. The difference lies in the use of the pound and star keys to submit or cancel the participant's recording. Thus, each participant must submit as message for it to be heard by the other conference participants. In addition, a "priority" mode selects the conference participant with the highest priority.

Referring back to audio signal 9, the echo cancellation component 102 is generated by echo cancellation module 70 in call processor 100 and represents the incoming audio signal without a substantial amount of background interference. Echo cancellation module 70 inverts a previously sampled baseline audio sample representative of a channel's background noise only (i.e. a quiet state) and applies the baseline sample to the audio signal. In this manner, the previously sampled base signal cancels the corresponding background signal in the audio signal and the resulting clean signal is free from a substantial amount of background interference. The resulting echo cancellation component 102 is applied to a speech recognition processor 135 that automatically converts signal 102 into a text message 141 of the spoken message and stores text message 141 in a storage device 142 for later retrieval. In this manner, an automatic written transcript for each channel 2 is generated and stored for later review. In addition, component 102 is processed to detect a plurality of control events 140. The control events 140 are similar to logical event signal 6 and are similarly stored in control logic queue 7.

Control events 140 are used to control the operation of system 50 through application logic controller 8. For example, conference participant 105 may say a command phrase such as "setup conference" and speech recognition processor 135 translates the phrase to a text message and compares the text to known command phrases stored in storage device 142. Once the text message is determined to be a command phrase, the appropriate control event signal 140 is generated and sent to either the control logic queue 7 or directly to the application logic controller 8. Once the "setup conference" phrase is detected, the following desired conference participant's names will be determined from the audio signal. Each participant will be contacted by the system and asked to join the conference by a text to speech module 14.

Text to speech module 14 converts a text message signal 13 into a speech signal 15 and presents speech signal 15 to call processor 100 through audio switch 180 for playback to the plurality of conference participants 105. When one of the conference participants 105 desires to setup a conference call, the textual names of the desired participants are determined by speech recognition processor 135 and are forwarded to application logic controller 8 and to text to speech processor 14 for playback during the initial contact call.

When the conference participant is contacted, they may be required to prove their identity. A voice sample of the participant is recorded and speech recognition processor 135 matches the voice pattern with previously verified patterns stored in database 142. If the sample is confirmed, the entry of the participant is announced to the other conference participants. If a participant 105 is new to the conference call and authorized to participate, but no verified pattern exists, an authorized conference participant can store the voice sample as a verified pattern in storage device 142. In addition, whenever a participant enters an existing conference call, the participant's name may be announced to all of the parties via text to speech processor 14.

If the system fails to contact a participant, fails to verify a participant or the participant denies the request, the existing conference participants are notified in the same manner via text to speech processor 14.

Application logic controller 8 can also be programmed to monitor external news and information sources and send a text message to text to speech processor 14. If a late breaking news flash or important stock price or index reaches a programmable limit, controller 8 generates the appropriate text message and forwards it on to text to speech processor 14. At the same time, controller 8 generates switch select signal 160 to preempt the conference call with the speech signal 15 if programmed to do so.

While several embodiments of the present invention have been described in connection with the accompanying attached drawings, it will be readily apparent to those skilled in the art that various changes and modifications may be made thereunto without departing from the spirit and scope of the present invention as defined by the appended claims.

What is claimed is:

1. A multi-channel telephone data collection, collaboration and conferencing system for use with a plurality of telephone channels, the telephone channels being interconnected to facilitate a conference call between a plurality of conferencing devices, the system comprising:
    a call processor having at least two conferencing device input/output ports connected to said processor and to said plurality of conferencing devices, said call processor generating an audio signal corresponding to each of said plurality of conferencing devices connected to said input/output ports;
    a memory device that stores said audio signals corresponding to each conference device;
    an audio switch, connected to said call processor and said memory device, having a plurality of audio inputs corresponding to each of said conference devices; and
    an application logic controller, connected to said call processor, said audio switch and to said memory device, that controls the operation of the system and generates a select signal according to a programmable talk mode, said select signal selects at least one of said audio switch inputs to present to said output ports of said call processor.

2. The system according to claim 1, further comprising an audio saving module connected to the call processor including:
    an analog to digital (A/D) converter to convert analog audio signals to a digital signal for storage in said memory device; and
    a time clock that records the system time.

3. The system according to claim 2, wherein said memory device stores said audio signal in a queue, said queue including a start time of said audio signal and a stop time of said audio signal.

4. The system according to claim 1 further comprising a text to speech processor, connected to said application logic controller and to said audio switch, that receives a text message from said application logic controller, converts said text message to an audio speech signal and presents said audio speech signal to said audio switch.

5. The system according to claim 1, wherein said programmable talk mode is a "chat" mode and said application logic controller generates a select signal that selects said audio signal stored in said memory device that occurred first in time.

6. The system according to claim 1, wherein said programmable talk mode is a "conference" mode and said application logic controller generates a select signal that selects all of said audio signals as they are stored in said memory device.

7. The system according to claim 1, wherein said programmable talk mode is a "short-over-long" mode and said application logic controller generates a select signal that selects audio signals that are shortest in duration.

8. The system according to claim 1, wherein said programmable talk mode is a "priority" mode and said application logic controller generates a select signal that selects audio signals having a highest priority level.

9. The system according to claim 1 further comprising a control logic queue connected to said call processor and to said application logic controller that stores at least one logical event, wherein said logical event alters the configuration of the conference call.

10. The system according to claim 9, wherein said call processor further includes a DTMF detector to detect the presence of said logical event corresponding to each of said plurality of conferencing devices connected to said conferencing device input ports and stores said logical event in said control logic queue.

11. The system according to claim 1 further comprising:
a speech recognition processor, connected to said call processor and said application logic controller, that receives said audio signal corresponding to each of said plurality of conferencing devices respectively and detects the presence of a spoken control event, said speech recognition processor forwards said spoken control event to said application logic controller if said spoken control event is detected.

12. The system according to claim 1 further comprising:
a speech recognition processor, connected to said call processor that receives said audio signal corresponding to each of said plurality of conferencing devices respectively and converts said audio signal to a text message representing the spoken words of said audio signal; and
a database, connected to said speech recognition processor that stores said text messages for subsequent review.

13. The system according to claim 11, wherein said speech recognition processor detects a request to join the teleconference and compares said request with a plurality of previously stored requests, said previously stored requests include an audio sample of said request and an identifier indicating a name of the caller making said request, said speech recognition processor forwarding said name to said application logic controller if the comparison is successful.

14. The system according to claim 1 further comprising a text to speech processor, connected to said application logic controller and to said audio switch, that receives a text message from said application logic controller, converts said text message to an audio speech signal and presents said audio speech signal to said audio switch.

15. The system according to claim 14, wherein said application logic controller generates said select signal to select said audio speech signal to be presented to said output ports of said call processor, said audio speech signal having a higher priority than said audio signals.

16. The system according to claim 14, wherein said text message is comprised of a real time world event news headline.

17. The system according to claim 15, wherein said text message is comprised of a real time stock quote.

18. The system according to claim 9 further comprising:
a speech recognition processor, connected to said call processor and to said control logic queue, that receives said audio signal corresponding to each of said plurality of conferencing devices respectively and detects the presence of a spoken control event, said speech recognition processor stores said spoken control event in said control logic queue if said spoken control event is detected.

19. The system according to claim 12 further comprising:
an echo canceling database, connected to said call processor, said database comprising a plurality of baseline audio samples representing a quiet state corresponding to each of said input/output ports, wherein said baseline audio sample is unique for each of said plurality of conferencing devices; and
an echo canceling processor, connected to said echo canceling database, said speech recognition processor and to said memory device, that multiplies said audio signal from said memory device with an inverse of said corresponding baseline audio sample to remove baseline audio information, generates a clean audio signal, stores said clean audio signal in said memory device and presents said clean audio signal to said speech recognition processor.

20. A multi-channel telephone data collection, collaboration and conferencing system for use with a plurality of telephone channels, the system comprising:
a call processor having at least two conferencing device input/output ports connected to said processor and to said plurality of conferencing devices, said call processor generating an audio signal corresponding to each of said plurality of conferencing devices connected to said conferencing device input/output ports; and
a speech recognition processor, connected to said call processor, that receives said audio signal corresponding to each of said plurality of conferencing devices respectively, and converts said audio signal into an individual digital representation of each of a plurality of spoken words contained within said audio signal, wherein said individual digital representations are used to train said speech recognition processor for subsequent audio signals.

21. The system according to claim 20, further comprising a memory device, connected to said call processor and said speech recognition processor, that stores said individual digital representations for subsequent review or transmission.

22. A method for telephone conferencing utilizing a plurality of telephone channels, the telephone channels being interconnected to facilitate a conference call between a plurality of conferencing devices, the method comprising the steps of:
receiving an audio input signal corresponding to each of said plurality of conferencing devices;
storing said audio input signal in a memory device;

retrieving at least one audio input signal stored in said memory device in accordance with a programmable talk mode; and outputting said at least one audio input signal to said plurality of conferencing devices.

23. The method according to claim 22, further comprising the steps of:

performing echo cancellation on each of said audio input signals to generate a clean signal by removing any background interference;

transcribing said clean signal using a speech recognition processor to generate a textual representation of said clean signal; and storing said textual representation in a database for later review.

24. The method according to claim 22, further comprising the steps of:

receiving a new audio input signal representing a new conferencing device;

recording an audio sample of a user's voice accessing said conferencing device;

verifying said audio sample with a plurality of previously stored audio samples; and storing said new audio input signal in said memory device if said comparison is successful.

25. The method according to claim 22, wherein said programmable talk mode is a "chat" mode and said step of retrieving selects said audio input signal stored in said memory device that occurred first in time.

26. The method according to claim 22, wherein said programmable talk mode is a "conference" mode and said step of retrieving selects all of said audio input signals as they are stored in said memory device.

27. The method according to claim 22, wherein said programmable talk mode is a "short-over-long" mode and said step of retrieving selects audio input signals that are the shortest in duration.

28. The method according to claim 22, wherein said programmable talk mode is a "priority" mode and said step of retrieving selects audio signals having a highest priority level.

* * * * *